(12) United States Patent
Casarotto et al.

(10) Patent No.: US 12,479,243 B2
(45) Date of Patent: Nov. 25, 2025

(54) WINTER TYRE

(71) Applicant: PIRELLI TYRE S.P.A., Milan (IT)

(72) Inventors: Giovanni Casarotto, Milan (IT); Diego Ettore Speziari, Milan (IT); Gianmarco Fasano, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 0 days.

(21) Appl. No.: 18/716,789

(22) PCT Filed: Nov. 29, 2022

(86) PCT No.: PCT/IB2022/061541
§ 371 (c)(1),
(2) Date: Jun. 5, 2024

(87) PCT Pub. No.: WO2023/119019
PCT Pub. Date: Jun. 29, 2023

(65) Prior Publication Data
US 2025/0033420 A1    Jan. 30, 2025

(30) Foreign Application Priority Data
Dec. 23, 2021 (IT) .................. 102021000032588

(51) Int. Cl.
*B60C 11/12* (2006.01)

(52) U.S. Cl.
CPC ... *B60C 11/1204* (2013.01); *B60C 2011/1213* (2013.01)

(58) Field of Classification Search
CPC .................................................. B60C 11/1218
See application file for complete search history.

(56) References Cited

FOREIGN PATENT DOCUMENTS

| | | |
|---|---|---|
| CN | 110654176 A | 1/2020 |
| EP | 2026983 A1 | 2/2009 |
| JP | 2006096324 A | 4/2006 |
| JP | 2007015510 A | 1/2007 |
| KR | 20160046007 A * | 4/2016 |
| WO | 2007/145603 A1 | 12/2007 |
| WO | 2012/164449 A1 | 12/2012 |
| WO | 2012/164450 A1 | 12/2012 |

(Continued)

OTHER PUBLICATIONS

Machine translation: KR-20160046007-A, Cho Myung Kug, (Year: 2025).*

(Continued)

*Primary Examiner* — Kendra Ly
(74) *Attorney, Agent, or Firm* — Steinfl + Bruno LLP

(57) ABSTRACT

A tyre includes at least one block on which at least one complex type sipe is obtained separating the block into two portions having a first surface and a second surface facing each other. The first surface is extended between a set of first and second longitudinal sections having, respectively, a first and a second radial profile, which are symmetrical to each other, each one comprising a coupling portion between the two block portions formed by a protrusion and a recess defined by three consecutive inclined lengths, the pattern of which is such that the ends of the coupling portion are offset from each other along a direction transverse to the longitudinal direction of the sipe.

27 Claims, 3 Drawing Sheets

(56) References Cited

FOREIGN PATENT DOCUMENTS

WO  WO-2015190391 A1 * 12/2015 ............. B60C 11/12
WO      2018/140851 A1    8/2018

OTHER PUBLICATIONS

Machine translation:WO-2015190391-A1, Arima M, (Year: 2025).*
International Search Report and Written Opinion for Application No. PCT/IB2022/061541 filed Nov. 29, 2022 on behalf of Pirelli Tyre S.P.A Mailed on Mar. 15, 2023. 19 pages.

* cited by examiner

WINTER TYRE

CROSS-REFERENCE TO RELATED APPLICATIONS

The present application is the U.S. National Stage of International Patent Application No. PCT/IB2022/061541 filed on Nov. 29, 2022, which, in turn, claims priority to Italian Patent Application No. 102021000032588 filed on Dec. 23, 2021.

The present invention relates to a tyre, especially a winter tyre.

A tyre generally comprises a carcass structure, toroidally shaped about a rotation axis, on which they are applied in a radially outer position, a belt structure and, further overlapped, a tread band, made of elastomeric material, on which a tread surface intended to contact the road surface is defined.

The tread band is typically defined by a plurality of circumferential and/or transverse grooves, delimiting a corresponding plurality of blocks which, taken together, define the tread pattern of the tyre.

The characteristics of the tread band, and in particular the amount and configuration of the grooves and blocks provided on the tread surface, primarily determine the performance of the tyre in terms of its road behaviour, particularly in relation to the possible different road surface conditions.

In order to improve a tyre grip on a snowy surface, small notches, known as "sipes", may be obtained on the blocks of the tread band, extended from the tyre tread surface towards the inside of the block. The function of the notches is to provide additional grip elements on the snowy road surface and to retain a certain amount of snow, thereby improving grip on the snowy road surface.

However, the presence of notches on the tread band blocks may reduce the performance of the tyre in case the road surface is free of snow, whether dry or wet, due to the reduced ability of the blocks to adequately bear shear stresses when accelerating, braking or driving bends.

"Circumferential" direction refers to a direction generally oriented according to the rotation direction of the tyre, or, at most, slightly inclined (e.g. at most of about 5°) with respect to the rotation direction of the tyre.

"Axial" direction refers to a direction that is substantially parallel to the rotation axis of the tyre, or, at most, slightly inclined (e.g. at most of about 5°) with respect to that rotation axis of the tyre. The axial direction is generally perpendicular to the circumferential direction.

"Radial" direction refers to a direction perpendicularly intersecting the rotation axis of the tyre, or, at most, slightly inclined (e.g. at most of about 5°) with respect to the direction perpendicular to the rotation axis of the tyre.

The term "groove" refers to a cavity formed in a portion of the tread band, extending in a main longitudinal direction and having a width equal to or greater than 1.5 mm.

Preferably, the groove has a depth of at least 3 mm.

The term "sipe" refers to a cavity obtained in a portion of the tread band, extending along a main longitudinal direction and having a width lower than 1.5 mm.

A groove or a sipe is said to be "circumferential" when it is globally extended along a circumferential direction.

A groove or a sipe is said to be "transverse" when it is extended along a direction that is inclined with respect to the circumferential direction by an acute angle greater than at least 10°.

The width of a groove or sipe is intended to be measured perpendicularly to both the longitudinal direction of the groove or sipe and the radial direction of the tyre, at a depth greater than or equal to 1.5 mm, preferably greater than or equal to 2 mm.

"Block" refers to a portion of the tread band intended to contact the road surface and delimited along its entire perimeter by one or more grooves and possibly by an axial end of the tread band.

A sipe obtained on a block, separates that block into two block portions having respective mutually facing surfaces.

A sipe is defined as of the "complex type" when at least one of the mutually facing surfaces of the block portions has at least one protrusion, while the other of such surfaces has a corresponding recess, suitable for at least partially accommodating such protrusion.

In other words, the respective projections on a plane perpendicular to the radial direction of the two block portions separated by the sipe are at least partially overlapped at the protrusion and the corresponding recess.

Thereby, a relative displacement of the two block portions along the radial direction is hindered by the interference between the two block portions at the protrusion and the recess.

A complex type sipe is also known in the field as a "three-dimensional" sipe.

A sipe is defined as of the "simple type" when there are no protrusions and/or recesses, on the mutually facing surfaces of the block portions, interfering with each other in the relative displacement of the two block portions along the radial direction. The surfaces of respective block portions facing each other at a sipe are "substantially parallel" to each other when the distance between such surfaces is substantially constant, meaning that such distance is comprised within a range of more or less 50% of the average value of the distance calculated throughout the extent of the sipe.

Furthermore, two directions or two linear lengths are "substantially parallel" when they are inclined to each other by an angle lower than 5°.

The "radial profile" of a surface of a block portion separated by a sipe refers to the line of intersection between said surface and a plane parallel to the radial direction and to a direction transverse to the longitudinal direction defined by the development of the sipe on the tread surface.

A radial profile may include a "coupling portion", referring to the portion of the profile outlining a protrusion or recess in the surface.

The inclination of a first direction with respect to a second direction is generally defined by the acute angle formed by the first direction with the second direction.

Two different directions are inclined with an "opposite sign" with respect to an oriented reference direction when, once an angle measured clockwise or counterclockwise is established as positive, the acute angles defined by the two directions with the oriented reference direction have opposite signs.

For example, a first length and a second length of a radial profile will have inclinations of opposite sign with respect to a radial direction of the tyre, when, in the same half-plane delimited by the radial direction, the acute angle of the first length is directed towards the tread surface and the acute angle of the second length is directed towards the inside of the tyre.

An example of a winter tyre whose blocks are concerned by complex type sipes is disclosed in the International Patent Application WO 2018/140851, where sipes are described as having radial profiles with a plurality of protrusions and recesses formed by flat quadrilateral surfaces arranged at 90° to each other joined at a vertex.

Other examples of winter tyres whose blocks are concerned by complex type sipes are disclosed in the International Patent Applications WO 2012/164449 and WO 2012/164450, respectively, in the name of the same Applicant, wherein sipes with a variable longitudinal pattern, e.g. straight or wavy, depending on the depth of the sipes, are described.

The Applicant has firstly verified that providing complex type sipes on the blocks increases their stiffness when subjected to shear stresses, improving the performance of the tyre on dry or wet road surfaces both in the braking as well as in the traction and driving bends.

In particular, the Applicant has observed that the stiffness of a block increases as interference surfaces between the block portions increase and thus as the size and number of the protrusions obtained on the respective surfaces increase.

The Applicant has, however, verified that the increase in the interference surfaces between the block portions also involves certain disadvantages, including, in particular, an increased difficulty in manufacturing the tyre. In fact, the sipes are made while moulding the tread band, and the presence of complex type sipes having excessively large interference surfaces may lead to undesirable tearing of the tread band when the tyre is taken out of the mould.

The Applicant has also verified that an excessive increase in the stiffness of the block, due to the provision of complex type sipes, may lead to a reduced effectiveness in snow retention, due to the reduced mobility of the adjacent block portions, thus hindering the performance of the tyre on snowy road surfaces.

In this context, the Applicant has felt the need to made a tyre provided with complex type sipes configured in such a way as to optimally balance the conflicting requirements mentioned above in order to improve the performance of the tyre both on snowy road surfaces and, globally, on dry or wet road surfaces.

The Applicant has therefore perceived that this requirement may be fulfilled by configuring the complex type sipe in such a way as to obtain a sufficiently large interference surface capable of effectively blocking the relative displacement of adjacent block portions and, at the same time, in such a way that the aforesaid blocking between the block portions is achieved with a relatively low degree of block deformation.

The Applicant has finally found that a complex type sipe defining, on the surfaces of mutually facing block portions, a plurality of alternating recesses and protrusions along the longitudinal sipe development and configured in such a way as to define on said surfaces a continuous alternation of radial profiles having a protrusion and a recess suitably spaced radially and transversely, gives the block, when subjected to typical driving stresses, excellent stiffness properties without hindering snow retaining ability and without making tyre construction operations complex.

Therefore, the invention, in a first aspect thereof, relates to a tyre comprising a tread band, a tread surface radially external to said tread band, at least one block defined on said tread band, and at least one complex type sipe formed on said at least one block.

Preferably, said sipe is open on said tread surface to define a longitudinal development direction of said sipe.

Preferably, said complex type sipe separates said at least one block into a first block portion comprising a first surface extending from said tread surface towards the inside of said tread band, and into a second block portion comprising a second surface extending from said tread surface towards the inside of said tread band and facing said first surface.

Preferably, said second surface is substantially parallel to said first surface.

Preferably, said first surface is extended continuously between at least a first longitudinal section having a first radial profile and at least a second longitudinal section, spaced from said first longitudinal section, having a second radial profile.

Preferably, said first radial profile comprises a first coupling portion between said first block portion and said second block portion, defining a first protrusion of said first surface and a first recess of said first surface radially inner with respect to said first protrusion.

Preferably, said second radial profile comprises a second coupling portion between said first block portion and said second block portion, defining a second recess of said first surface and a second protrusion of said first surface radially inner with respect to said second recess.

Preferably, said first coupling portion is extended between a first radially outer end and a second radially inner end.

Preferably, said first end is crossed by a first reference plane parallel to said longitudinal direction of said sipe and to a radial direction of said tread band.

Preferably, said second end is crossed by a second reference plane parallel to said first reference plane.

Preferably, said first protrusion is delimited by a first length of said first radial profile, extended with a first inclination with respect to said radial direction, and by a second length of said first radial profile, extended from said first length with a second inclination with respect to said radial direction of opposite sign to said first inclination.

Preferably, said first length is extended from said first end.

Preferably, said first recess is defined on the opposite side to said first protrusion with respect to said first reference plane.

Preferably, said first recess is delimited by said second length of said first radial profile and by a third length of said first radial profile extended from said second length and having a third inclination with respect to said radial direction of opposite sign to said second inclination.

Preferably, said third length is extended from said second length to said second end.

Preferably, said second reference plane is spaced from said first reference plane.

Preferably, said second reference plane is interposed between said first recess and said first reference plane.

The provision of complex type sipes having the above-mentioned characteristics makes it possible to advantageously increase remarkably the stiffness of the block without hindering the tyre manufacturing step, in particular the operations of extracting the tyre from the mould, or excessively limiting the tyre snow-retaining ability.

The Applicant has verified, in particular, how, with such a configuration, the interference between the two block portions occurs over a particularly large surface area, thus increasing the blocking degree of the displacement between the two block portions and consequently its stiffness, and, at the same time, how this interference condition is rapidly reached as stresses increase.

It is thereby possible to obtain a winter tyre with excellent performance on both snowy road surfaces and dry or wet road surfaces.

Furthermore, the configuration of the complex type sipe according to the present invention makes it possible to apply it in even non-directional tyres, e.g. asymmetrical tyres.

The present invention, in the aforementioned aspect, may have at least one of the preferred characteristics hereinafter indicated, taken individually or in combination.

Preferably, said first recess is defined on the opposite side to said protrusion with respect to said first reference plane and said second reference plane.

In some embodiments, said first end of said first coupling portion belongs to a radially outer edge of said first surface.

In other words, the first length of the coupling portion, inclined with respect to the radial direction, is extended up to the tread surface, which makes it possible, all other things being equal, to have a protrusion that is larger and/or closer to the tread surface.

Preferably, said first length of said first radial profile is substantially straight.

Preferably, said first length of said first radial profile is inclined with respect to said radial direction by a first angle comprised between 3° and 25°, more preferably between 5° and 10°, and still more preferably by about 6.5°.

It is thereby possible to obtain an adequately sized protrusion close to the tread surface without resorting to lengths with excessive inclinations that would form, at the tread surface, excessively weak block portions of the tread, which would easily tear.

Preferably, said second length of said first radial profile is substantially straight.

Preferably, said second length of said first radial profile is inclined with respect to said radial direction by a second angle comprised between 15° and 45°, more preferably between 25° and 35°, and even more preferably by about 30°.

In some embodiments, said second end of said first coupling portion belongs to a radially inner edge of said first surface.

In other words, the third length of the coupling portion, inclined with respect to the radial direction, is extended to the bottom of the sipe.

Preferably, said first radial profile has no lengths parallel to said radial direction.

Thereby, the entire first surface, at the first longitudinal section, is used to create interference with the corresponding second surface.

Preferably, said third length of said first radial profile is substantially straight.

Preferably, said third length of said first radial profile is inclined with respect to said radial direction by a third angle comprised between 3° and 25°, more preferably between 5° and 10°, and even more preferably by about 6.5°.

In some embodiments, said first length and said third length of said first radial profile are substantially parallel to each other.

In some embodiments, said first surface extends radially within the tread band for a depth comprised between 5 mm and 15 mm, more preferably for about 7 mm.

Preferably, said first protrusion is distant from said tread surface by a measure comprised between 1.5 mm and 2 mm from said tread surface, more preferably about 1.75 mm.

Preferably, said first recess is distant from said tread surface by a measure comprised between 5 mm and 5.5 mm, more preferably about 5.25 mm.

Preferably, said first recess is distant from said radially inner edge of said first surface by a measure comprised between 1.5 mm and 2 mm, more preferably about 1.75 mm.

Preferably, the distance between said first surface and said second surface is comprised between 0.2 mm and 0.5 mm, more preferably is of about 0.3 mm.

In some embodiments, the distance between said first protrusion and said first reference plane is comprised between about 0.1 mm and about 0.4 mm, more preferably is about of 0.2 mm.

In some embodiments, the distance between said first recess and said second reference plane is comprised between about 0.1 mm and about 0.4 mm, more preferably is of about 0.2 mm.

In some embodiments, the distance between said first reference plane and said second reference plane is comprised between 1 mm and 3 mm, more preferably is of about 2 mm.

In some embodiments, said second radial profile is essentially symmetrical to said first radial profile with respect to a plane of symmetry parallel to said first reference plane.

The pattern of the first radial profile is thereby repeated in a substantially mirror-like manner in the second radial profile, so that the interference between the two portions of the block is substantially homogeneous when the block is subjected to tangential stresses having transverse directions opposite to the development direction of the sipe.

In some embodiments, said first surface comprises a third longitudinal section, interposed between said first longitudinal section and said second longitudinal section, and having a third radial profile substantially parallel to said radial direction.

In some embodiments, said first surface comprises a plurality of first longitudinal sections, each first longitudinal section being alternated with a corresponding second longitudinal section.

Preferably, a section of said first surface with a plane parallel to said tread surface has a wavy pattern, more preferably such pattern is substantially sinusoidal or broken-line, e.g. zigzagged.

Preferably, said wavy pattern, or more preferably substantially sinusoidal or broken line pattern, is obtained for each section of said first surface with a respective plane parallel to said tread surface at different distances from said tread surface.

In some embodiments, said wavy pattern, more preferably substantially sinusoidal or broken line pattern, has a pitch comprised between 1.5 mm and 6 mm, more preferably of about 3 mm.

In some embodiments, a plurality of said complex type sipes is obtained on said at least one block.

The ability of the block to retain snow is thereby increased.

In one version, only said complex type sipes are made on said at least one block.

Thereby, with the same number of sipes, the stiffness of the block is maximised.

In some embodiments, on said at least one block, said plurality of said complex type sipes is interspersed with at least one simple type sipe.

Thereby, with the same number of sipes, it is possible to optimise the block stiffness with the block ability to retain snow.

The characteristics and advantages of the invention will become clearer from the detailed description of an embodiment shown, by way of non-limiting example, with reference to the appended drawings wherein.

Figure 1:
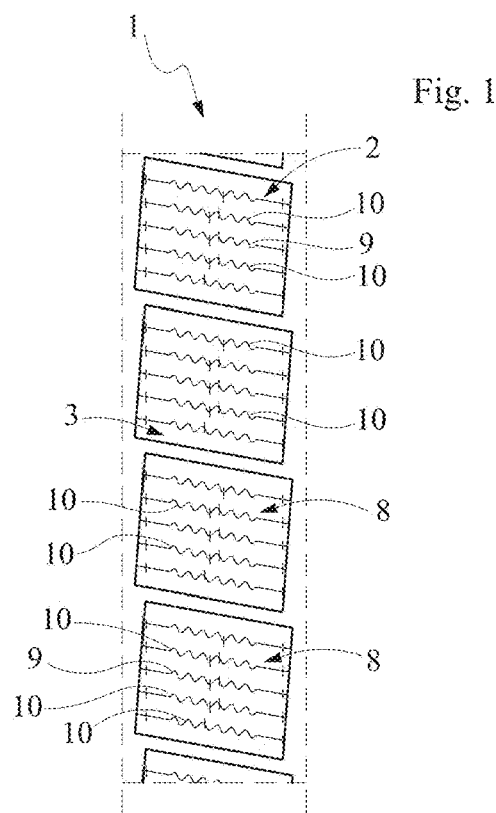
FIG. 1 is a schematic view of a portion of a tread band developed in a plane, of a tyre made in accordance with the present invention including some blocks with complex type sipes.

With reference to the enclosed Figures, 1 globally denotes a tyre made in accordance with the present invention.

Tyre 1 comprises a tyre structure, conventional in itself and not represented in the enclosed figures, as well as a tread band 2, which is arranged in a radially outer position of the tyre 1 and on which a tread surface 3 is defined.

The portion of tread band 2 specifically intended to contact the road surface is connected at its axially opposite ends to the sidewalls of the tyre 1.

A plurality of grooves, delimiting a plurality of blocks 8, arranged in sequence along a circumferential development of the tread band 2, is obtained on the tread band 2.

The set of blocks 8 and grooves defines the tread pattern of the tyre 1, which can be configured so as to define a preferred rolling direction, resulting in a directional tyre, or it may be configured to have similar behaviours regardless of the rolling direction, for example resulting in an asymmetrical tyre.

On each block 8 a plurality of complex type sipes 10 is obtained which, in some cases, may be interspersed with a simple type sipe 9.

The sipes 9 and 10 are open on the tread surface 3 and are extended parallel to each other along a respective longitudinal development direction X.

Each sipe 9 or 10 is open on the tread surface 3 showing along the longitudinal direction X a wavy, almost sinusoidal pattern having a pitch P of about 3 mm.

Each complex type sipe 10 separates the respective block 8 into a first block portion 11 and a second block portion 12, which respectively have a first surface 13, extending from the tread surface 3 towards the inside of the tread band 2 and directed towards the second block portion 12, and a second surface 14, extending from the tread surface 3 towards the inside of the tread band 2 and facing the first surface 13.

In the present embodiment, the first surface 13 and the second surface 14 are substantially parallel, spaced apart of about 0.3 mm from each other, so the following detailed description of the first surface 13 is mirror-like reflected in the second surface 14.

The first surface 13 is extended towards the inside of the tread band 2 for a depth of about 7 mm, from an outer edge 15, open on the tread surface 3, to an inner edge 16, defined on the bottom of the sipe 10.

Figure 5:
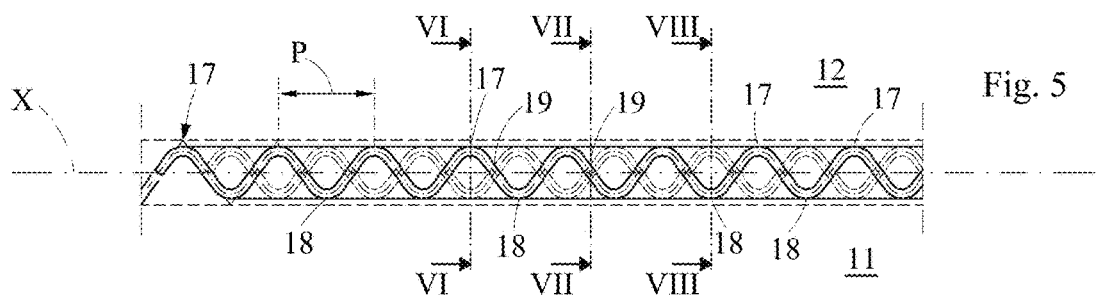
FIG. 5 is an enlarged scale and plan from the top view of a complex type sipe obtained from the portion of the tread band of FIG. 1.

The outer edge 15 and the inner edge 16 show a wavy pattern along the longitudinal direction X, having the same pitch, however, the two patterns are out of phase with each other by half a pitch, as shown in FIG. 5.

The wavy pattern makes it possible to identify on the first surface 13 a plurality of first longitudinal sections 17, corresponding to the points at which the outer edge 15 protrudes towards the second block 12, interspersed with a corresponding plurality of second longitudinal sections 18, corresponding to the points at which the outer edge 15 has a recess accommodating a protrusion of the second block portion 12.

Each pair of adjacent first longitudinal sections 17 and second longitudinal sections 18 is spaced apart by half a pitch. In addition, a third longitudinal section 19, substantially equidistant from the first longitudinal section 17 and the second longitudinal section 18, is further identified between each pair of adjacent first longitudinal sections 17 and second longitudinal sections 18.

The first surface 13 has, at the first longitudinal section 17, a first radial profile 20 (shown in FIG. 6), at the second longitudinal section 18, a second radial profile 21 (shown in FIG. 8) and at the third longitudinal section 19, a third radial profile 22 (shown in FIG. 7), formed by a single straight length parallel to the radial direction R.

The first radial profile 20 is formed by a sequence of lengths inclined with respect to the radial direction R which, together, define a first coupling portion between the first block portion 11 and the second block portion 12.

In embodiments not shown, the first radial profile 20 may have lengths parallel to the radial direction R in a radially outer or radially inner position to the first coupling portion.

The first coupling portion, which, as mentioned above, coincides in this case with the first radial profile 20, is extended between a first, radially outer end 23, which belongs to the outer edge 15, and a second radially inner end 24, which belongs to the inner edge 16.

The first end 23 and the second end 24 are crossed by a first reference plane A and a second reference plane B respectively, which are parallel to each other, and also parallel to the longitudinal direction X and the radial direction R.

The first radial profile 20 comprises a first protrusion 25 of the first surface 13 and, in a radially inner position, a first recess 26.

The first protrusion 25 is distant from the tread band surface 3 of about 1.75 mm and from the first reference plane A of about 0.2 mm.

The first protrusion 25 is delimited by a first substantially straight length 27 extended from the first end 23 and a second substantially straight length 28 extended in continuance of the first length 27.

The first length 27 is inclined by an angle of about 7° to the radial direction R, while the second length 28 has an inclination of opposite sign to the first length 27 with an angle of about 30° with respect to the radial direction R.

The first recess 26, in turn, is defined on the opposite side of said protrusion with respect to the first reference plane A and the second reference plane B, and is distant from the tread surface 3 of about 5.25 mm, from the second end 24 of about 1.75 mm and from the second reference plane B of about 0.2 mm.

The first recess 26 is delimited by the second length 28 and a third length 29 of the first radial profile 20, extended in continuance of the second length 28 to the second end 24.

The third length 29 is substantially straight and parallel to the first length 27, so that it is inclined with respect to the radial direction R by an angle of about 7°, with an inclination opposite to the second length 28.

The inclinations and extensions of the three lengths 27, 28 and 29 of the first radial profile 20 are such that the second reference plane B is interposed between the first recess 26 and the first reference plane A and the distance D between the first reference plane A and the second reference plane B is about 2 mm.

In addition, it will be noted that the distance H along the radial direction R between the first protrusion 25 and the tread surface 3 is substantially equal to the distance H along the radial direction R between the first recess 26 and the bottom of the sipe (identified by the second end 24) and substantially equal to half the distance along the radial direction R between the first protrusion 25 and the first recess 26.

Figure 6:
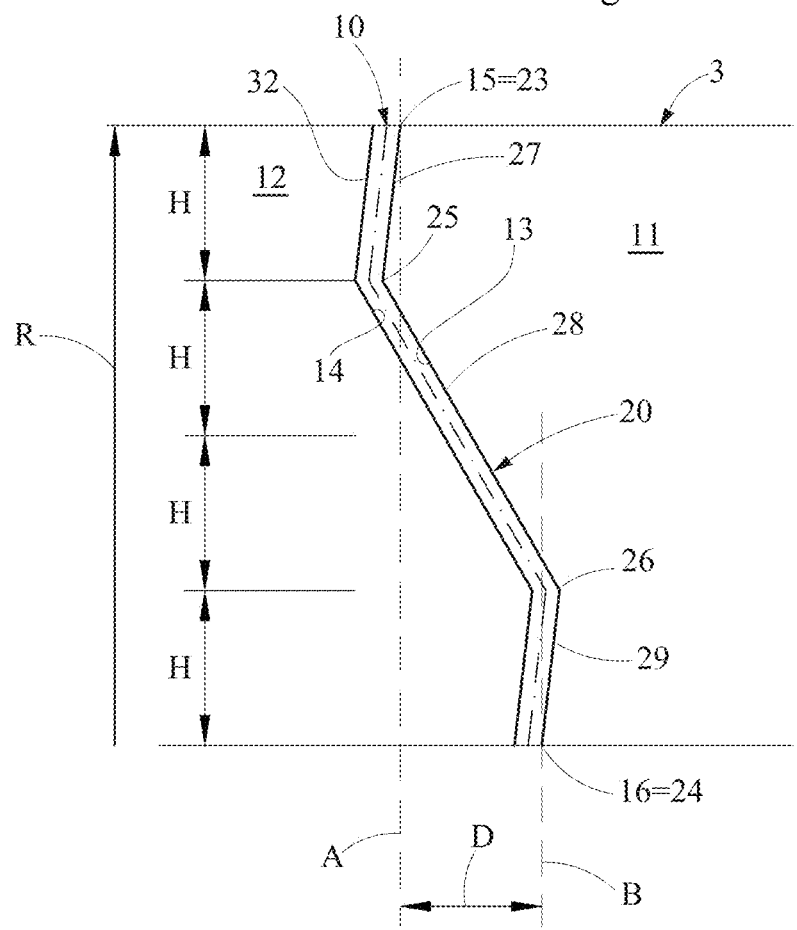
FIGS. 6, 7 and 8 are section views along the lines VI-VI, VII-VII and VIII-VIII, respectively, of the tread band portion of FIG. 5, FIGS. 9 and 10 are schematic views in a radial section of a block of FIG. 1 showing the behaviour of the block in the absence and, respectively, in the presence of tangential stresses.
Figure 7:
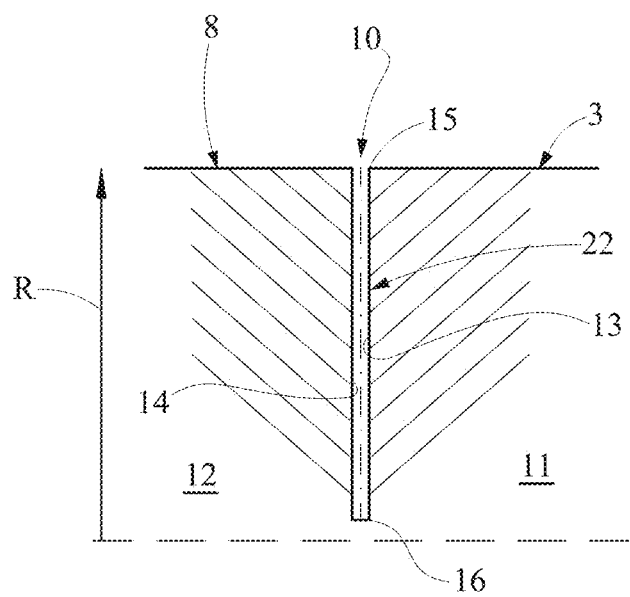
Figure 8:
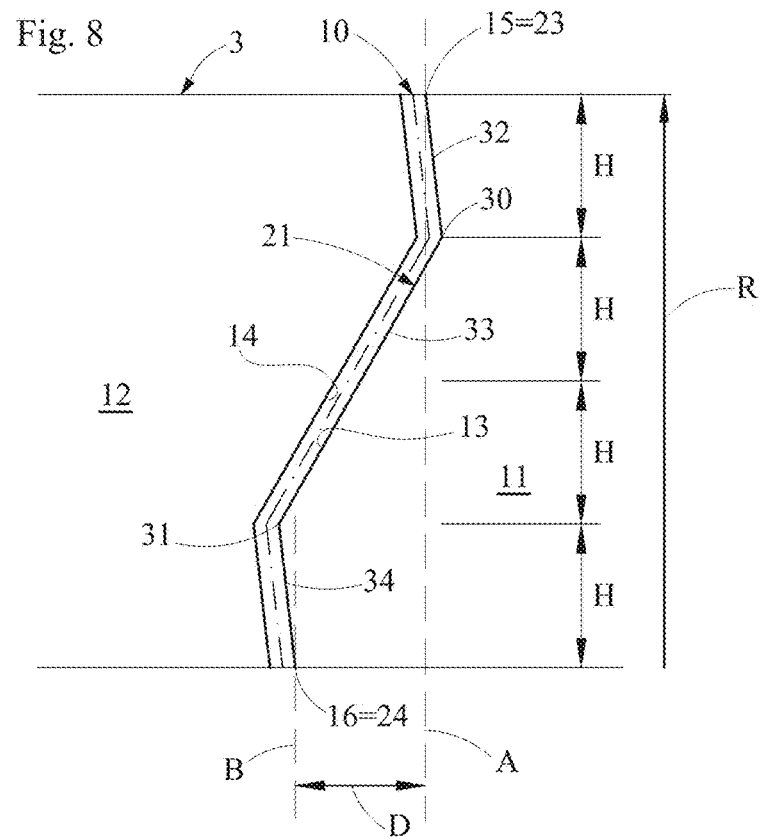

The first radial profile 20 and the second radial profile 21 are symmetrical to each other with respect to a plane of symmetry comprising the longitudinal direction X and the radial direction R of the tread band 2, as also visible from FIGS. 6 and 8.

Therefore, the preceding description related to the first radial profile 20 is also applicable in a mirror-like manner to the second radial profile 21.

Consequently, the second radial profile 21 comprises a second recess 30 defined in a radially outer position at the first protrusion 25 and a radially inner second protrusion 31, at the first recess 26.

In addition, the second recess 30 and the second protrusion 31 are delimited by lengths 32, 33, and 34 analogous to the first length 27, second length 28 and third length 29 respectively, of the first profile 20, with the difference that they are inclined in an opposite manner even though they have angles with an equal value.

Figure 2:
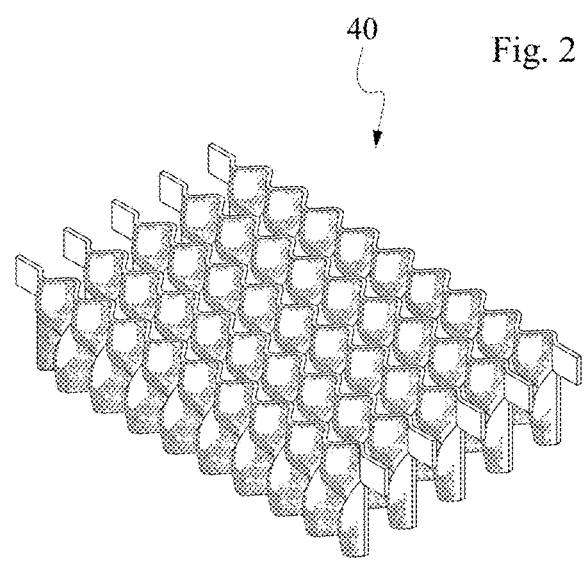
FIG. 2 is an enlarged scale and perspective view from the top of a plurality of mould elements used to make the complex type sipes in the tread band portion of FIG. 1.
Figure 3:
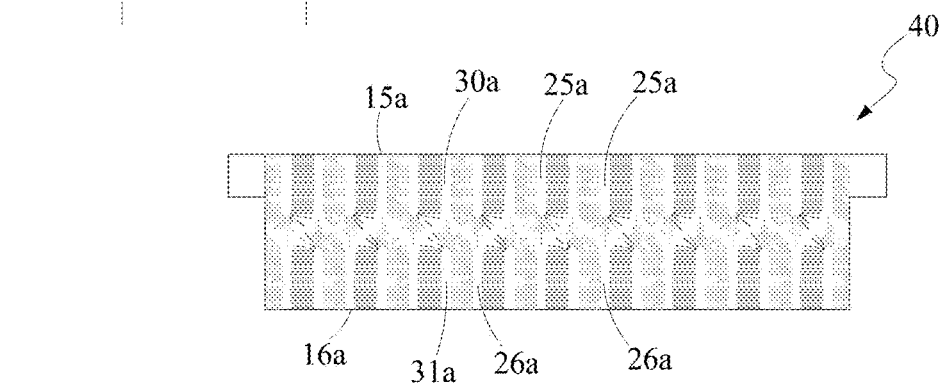
FIGS. 3 and 4 are frontal and plan from the top views respectively of a mould element of FIG. 2.
Figure 4:
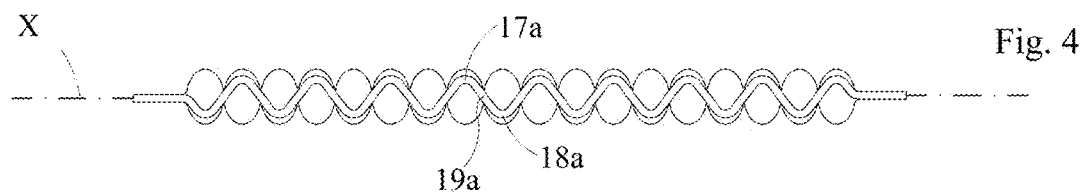

FIGS. 2 to 4 show different views of mould elements 40 configured to obtain on the tread band 2 corresponding complex type sipes 10.

In the mould elements 40, the geometric features defined by the sipe 10 on the first and second portions 11, 12 of block 8 may be identified.

To better emphasise the correlation between the first surface 13 and the mould elements 40, such geometric features are shown on the mould elements 40 in FIGS. 2 to 4 with the same numerical references used in the first surface 13 followed by letter "a".

Figure 9:
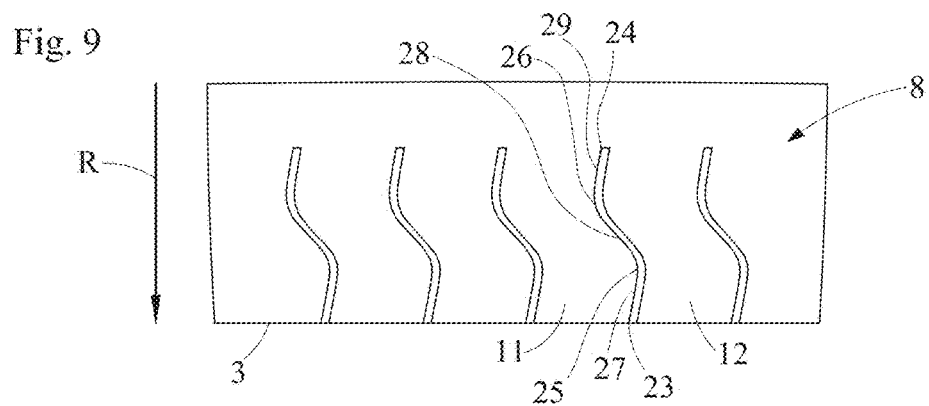
Figure 10:
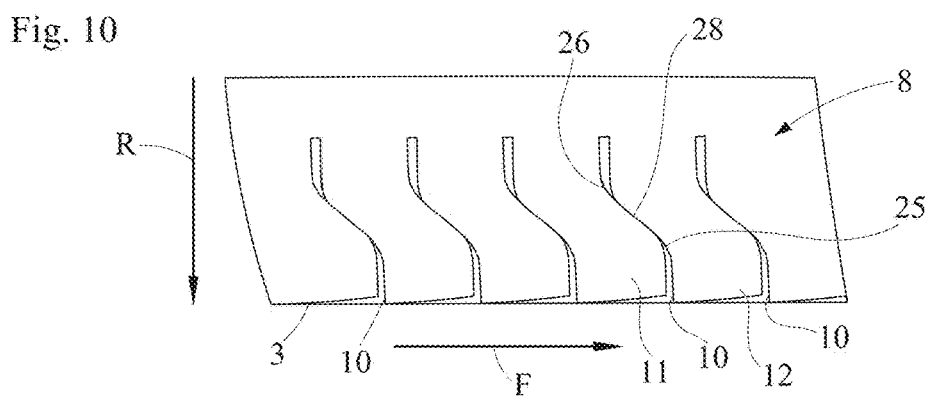

FIGS. 9 and 10 schematically show the behaviour of the block 8 when at rest (FIG. 9) and when subjected to a tangential stress F, representative of an acceleration or braking condition.

As it may be noted from the figures, when the block is at rest, the first surface 13 and the corresponding second surface 14 are spaced apart from each other, whereas when subjected to a tangential stress F, caused for example by braking, the portions 11 and 12 of the block deform until the first surface 13 and the second surface 14 come into contact at the second length 28 of each first radial profile 20 as well as the corresponding length 33 of each second radial profile 21.

The contact area between the two block portions 11, 12 is therefore particularly large, symmetrical and extended along the entire longitudinal development of the sipe 10.

In addition, the contact condition between the first surface 13 and the second surface 14 is achieved with a particularly low degree of tangential deformation of the block portions 11 and 12, e.g. of about 0.5 mm.

This leads to a high stiffness of the block achieved with a much lower degree of block deformation.

This advantageous property allows the block to perform well in traction or driving bends on dry or wet road surfaces, while also maintaining good performance in traction on snowy road surfaces.

The Applicant has also verified that a block provided with a plurality of complex type sipes 10 interspersed with a simple type sipe 9 may further improve performance on snowy surfaces without excessively hindering performance on wet and dry road surfaces.

Finally, the Applicant has verified that providing the blocks with complex type sipes made according to the present invention does not entail any particular problem in the extraction from the moulds during the tyre vulcanisation and moulding steps. Obviously, a person skilled in the art may make further modifications and variants to the above-described invention in order to meet specific and contingent application needs, variants and modifications in any case falling within the scope of protection as defined by the following claims.

The invention claimed is:

1. A tyre comprising a tread band, a tread surface radially outer to said tread band, at least one block defined on said tread band and at least one complex-type sipe obtained on said at least one block, said at least one complex-type sipe being open on said tread surface to define a longitudinal direction of development of said at least one complex-type sipe,
   wherein said at least one complex-type sipe separates said at least one block into:
      a first block portion comprising a first surface extended from said tread surface towards an inside of said tread band, and
      a second block portion comprising a second surface, extended from said tread surface towards the inside of said tread band, said second surface facing and being substantially parallel to said first surface,
   wherein:
      said first surface is extended continuously between at least a first longitudinal section having a first radial profile and at least a second longitudinal section, spaced from said first longitudinal section, having a second radial profile,
      said first radial profile comprises a first coupling portion between said first block portion and said second block portion, defining a first protrusion of said first surface and a first recess of said first surface radially inner with respect to said first protrusion,
      said second radial profile comprises a second coupling portion between said first block portion and said second block portion, defining a second recess of said first surface and a second protrusion of said first surface radially inner with respect to said second recess,
      said first coupling portion is extended between a first radially outer end, crossed by a first reference plane parallel to said longitudinal direction of said at least one complex-type sipe and to a radial direction of said tread band, and a second radially inner end, crossed by a second reference plane parallel to said first reference plane,
      said first protrusion is delimited by a first length of said first radial profile extended from said first end with a first inclination with respect to said radial direction, and by a second length of said first radial profile extended from said first length with a second inclination with respect to said radial direction of opposite sign to said first inclination,
      said first recess is defined on an opposite side to said first protrusion with respect to said first reference plane and is delimited by said second length of said first radial profile and by a third length of said first radial profile extended from said second length up to said second end and having a third inclination with respect to said radial direction of opposite sign to said second inclination,
      said second length of said first radial profile is longer than said first length of said first radial profile and longer than said third length of said first radial profile, said second length of said first radial profile is angled closer to said radial direction than to a direction perpendicular thereto, and said second reference plane is spaced from said first reference plane and is interposed between said first recess and said first reference plane.

2. The tyre according to claim 1, wherein said first end of said first coupling portion belongs to a radially outer edge of said first surface.

3. The tyre according to claim 1, wherein said first length of said first radial profile is substantially straight.

4. The tyre according to claim 1, wherein said first length of said first radial profile is inclined with respect to said radial direction by a first angle comprised between 3° and 25°.

5. The tyre according to claim 1, wherein said second length of said first radial profile is substantially straight.

6. The tyre according to claim 1, wherein said second length of said first radial profile is inclined with respect to said radial direction by a second angle comprised between 15° and 45°.

7. The tyre according to claim 1, wherein said second end of said first coupling portion belongs to a radially inner edge of said first surface.

8. The tyre according to claim 1, wherein said third length of said first radial profile is substantially straight.

9. The tyre according to claim 1, wherein said third length of said first radial profile is inclined with respect to said radial direction by a third angle comprised between 3° and 25°.

10. The tyre according to claim 1, wherein said first length and said third length of said first radial profile are substantially parallel to each other.

11. The tyre according to claim 1, wherein said first protrusion is distant from said tread surface by an amount comprised between 1.5 mm and 2 mm.

12. The tyre according to claim 1, wherein said first recess is distant from said tread surface by an amount comprised between 5 mm and 5.5 mm.

13. The tyre according to claim 1, wherein said first recess is distant from a radially inner edge of said first surface by an amount comprised between 1.5 mm and 2 mm.

14. The tyre according to claim 1, wherein a distance between said first protrusion and said first reference plane is comprised between about 0.1 mm and about 0.4 mm.

15. The tyre according to claim 1, wherein a distance between said first recess and said second reference plane is comprised between about 0.1 mm and about 0.4 mm.

16. Tyre according to claim 1, wherein a distance between said first reference plane and said second reference plane is comprised between 1 mm and 3 mm.

17. The tyre according to claim 1, wherein said second radial profile is substantially symmetrical to said first radial profile with respect to a plane of symmetry parallel to said first reference plane.

18. The tyre according to claim 1, wherein said first surface comprises a third longitudinal section interposed between said first longitudinal section and said second longitudinal section and having a third radial profile substantially parallel to said radial direction.

19. The tyre according to claim 1, wherein said first surface comprises a plurality of first longitudinal sections, each first longitudinal section being alternated with a corresponding second longitudinal section.

20. The tyre according to claim 1, wherein a section of said first surface with a plane parallel to said tread surface has a wavy pattern.

21. The tyre according to claim 20, wherein said wavy pattern is obtained for each section of said first surface with a respective plane parallel to said tread surface at different distances from said tread surface.

22. The tyre according to claim 20, wherein said wavy pattern has a pitch comprised between 1.5 mm and 6 mm.

23. The tyre according to claim 1, wherein said at least one complex-type sipe is a plurality of complex-type sipes obtained on said at least one block.

24. The tyre according to claim 23, wherein only said plurality of complex-type sipes is obtained on said at least one block.

25. The tyre according to claim 23, wherein on said at least one block said plurality of complex-type sipes is interspersed by a simple-type sipe.

26. The tyre according to claim 1, wherein a distance in said radial direction of said second length of said first radial profile is twice a distance in said radial direction of said first length of said first radial profile.

27. The tyre according to claim 1, wherein a distance in said radial direction of said second length of said first radial profile is twice a distance in said radial direction of said third length of said first radial profile.

* * * * *